(12) United States Patent
Gopal et al.

(10) Patent No.: US 9,045,172 B2
(45) Date of Patent: Jun. 2, 2015

(54) POWERTRAIN CATCHER BRACKET

(71) Applicant: Ford Global Technologies, LLC, Dearborn, MI (US)

(72) Inventors: Sriram Gopal, Ann Arbor, MI (US); Bhimaraddi Venkaraddi Alavandi, Canton, MI (US); John Vincent Fazio, Dearborn, MI (US); Matthew B. Makowski, Northville, MI (US); Djamal Eddine Midoun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 13/951,005

(22) Filed: Jul. 25, 2013

(65) Prior Publication Data

US 2015/0028626 A1    Jan. 29, 2015

(51) Int. Cl.
*B62D 21/15* (2006.01)
*B62D 21/11* (2006.01)
*F16F 7/12* (2006.01)

(52) U.S. Cl.
CPC .............. *B62D 21/155* (2013.01); *B62D 21/11* (2013.01); *F16F 7/12* (2013.01)

(58) Field of Classification Search
CPC .......... F16F 7/12; B62D 21/155; B62D 21/11
USPC ............. 296/187.09, 204; 180/291, 298, 312; 280/784
See application file for complete search history.

(56) References Cited

U.S. PATENT DOCUMENTS

| | | | |
|---|---|---|---|
| 5,337,852 A | 8/1994 | Kastner | |
| 5,681,057 A | 10/1997 | Whirley et al. | |
| 6,298,936 B1 * | 10/2001 | Yoshida | 180/232 |
| 8,511,416 B2 * | 8/2013 | Hiruma | 180/299 |
| 8,894,134 B2 * | 11/2014 | Tomozawa et al. | 296/204 |
| 2012/0187724 A1 * | 7/2012 | Tomozawa et al. | 296/193.09 |
| 2013/0033048 A1 | 2/2013 | Oyama et al. | |

FOREIGN PATENT DOCUMENTS

WO    WO-2009072614 A1 *  6/2009

* cited by examiner

*Primary Examiner* — Jason S Morrow
(74) *Attorney, Agent, or Firm* — Jason Rogers; Brooks Kushman P.C.

(57) ABSTRACT

A catcher bracket disposed between a powertrain and a sub-frame of a vehicle. The catcher bracket defines a load path in a collision that is sufficient to displace the powertrain that directs the force of the impact through the catcher bracket to a sub-frame of the vehicle. The sub-frame is connected to the body structure of the vehicle by fasteners that fracture to decouple the powertrain and sub-frame from the body structure of the vehicle to reduce the collision pulse.

17 Claims, 2 Drawing Sheets

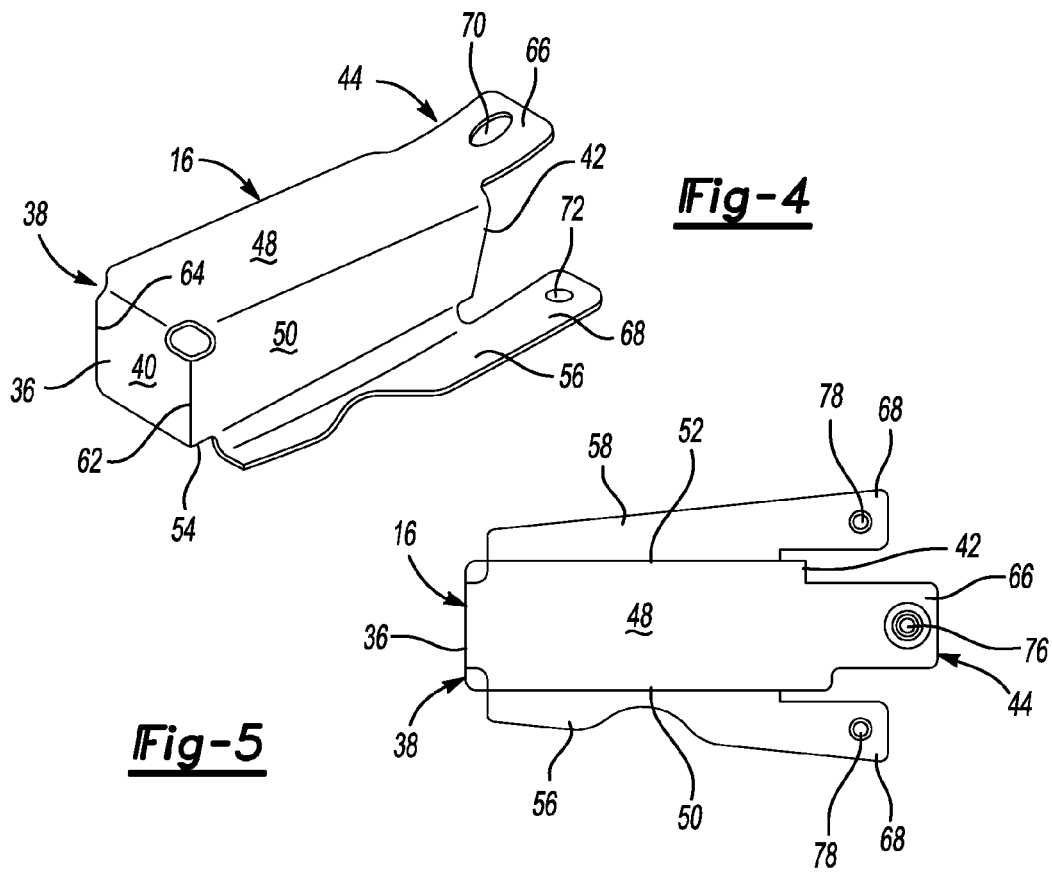
Fig-4
Fig-5
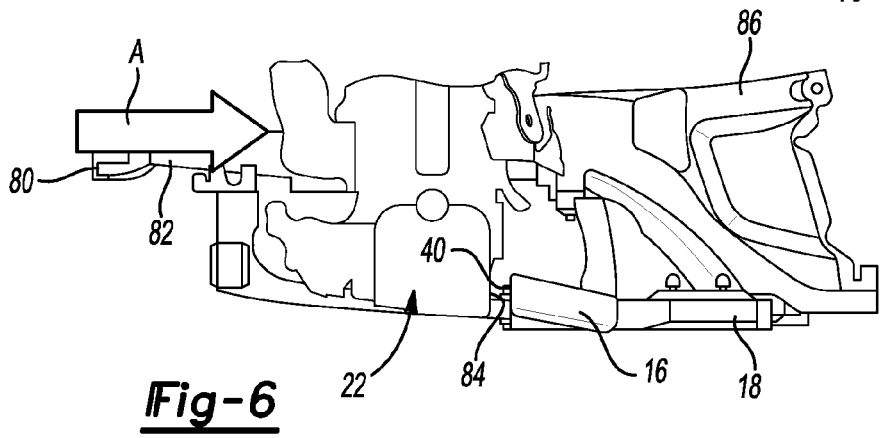
Fig-6
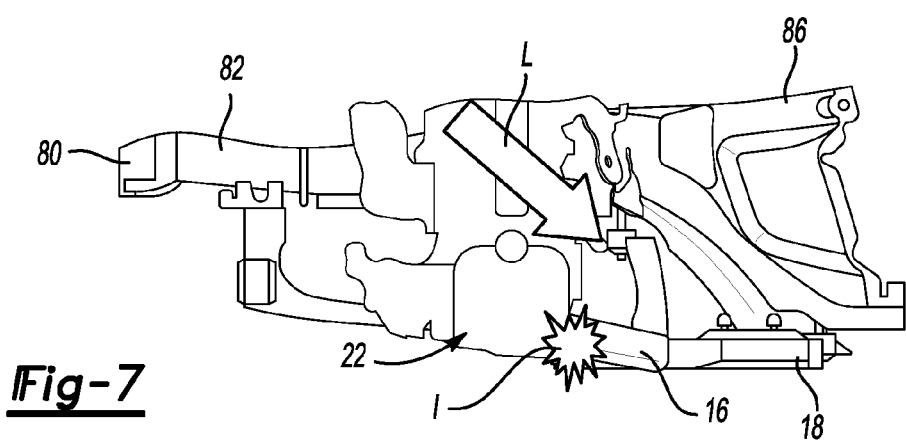
Fig-7

POWERTRAIN CATCHER BRACKET

TECHNICAL FIELD

This disclosure relates to an apparatus that reduces the extent of intrusion into the passenger compartment of a hybrid electric vehicle by decoupling a sub-frame from a body structure of a vehicle in a collision that causes the displacement of a powertrain.

BACKGROUND

Hybrid electric vehicles include both electric and gasoline powertrains for providing traction for the vehicle. Hybrid electric vehicles require added space for the dual (electric motor/combustion engine) powertrain that reduces the space available for absorbing energy in a collision. The dual powertrain including the transmission and battery increase the mass of the powertrain of the hybrid electric vehicle and increases the kinetic energy exerted by the powertrain upon the vehicle body and passenger compartment. Increased kinetic energy may be transferred to the passenger compartment and may result in an increased extent of intrusion into the passenger compartment.

Vehicle pulse is a term that is used to describe the deceleration function of a vehicle. Increasing vehicle pulse increases the peak severity of the impact and reduces the performance of the vehicle in crash tests. The reduced space available in hybrid electric vehicles and increased weight of hybrid electric vehicle powertrains both tend to reduce increase the deceleration pulse in a collision.

This disclosure is directed to solving the above problems and other problems as summarized below.

SUMMARY

This disclosure describes a catcher bracket for an engine/transmission powertrain of a hybrid electric vehicle. The vehicle may be a Full Hybrid Electric Vehicle ("FHEV") or a Partial Hybrid Electric Vehicle ("PHEV"). The powertrain and body structure of the vehicle may be decoupled from the body structure of the vehicle in the event of a collision. Decoupling the powertrain from the body structure is accomplished by providing a powertrain catcher bracket that allows the engine cradle sub-frame to decouple from the body structure. Decoupling reduces intrusions into the passenger compartment, particularly in the area of the dash panel/toe board. The powertrain is spaced from but is oriented to contact the catcher bracket in a collision. The catcher bracket is driven downwardly and rearward by the force of the collision causing the sub-frame to become decoupled from the body and slide below the passenger compartment.

According to one aspect of this disclosure, a catcher bracket disposed between a powertrain and a sub-frame of a vehicle comprises a tubular body and at least one fastener. The tubular body has an engagement end on a front portion that has an impact surface that is spaced from and faces the powertrain and an attachment end opposite the engagement end on a rear portion. The at least one fastener secures the attachment end of the tubular body to the sub-frame.

According to other aspects of this disclosure, the tubular body may have a top wall, a right side wall, and a left side wall that form a box-shaped enclosure extending between the engagement end and the attachment end and that defines an open bottom. The catcher bracket may further comprise a right side flange extending outwardly from the right side wall and a left side flange extending outwardly from the left side wall. The impact surface may further comprise an end wall that is provided at the engagement end that encloses the engagement end and provides a planar surface that is oriented to face a contact surface on the powertrain. The end wall may be joined on a right edge to the right side wall and may be joined on a left edge to the left side wall.

According to other aspects of this disclosure, the sub-frame may be a clam shell structure including an upper panel and a lower panel. The attachment end may include an upper flange that is attached to the upper panel and at least one lower flange that is attached to the lower panel. The at least one lower flange may further comprise a right flange and a left flange that are each connected to the lower panel. The tubular body may have a top wall, a right side wall and a left side wall that form a rectangular enclosure extending between the engagement end and the attachment end. A right side flange extends outwardly from the right side wall and a left side flange extends outwardly from the left side wall. A first fastener connects the right side flange to the sub-frame and a second fastener connects the left side flange to the sub-frame. A top wall flange extends rearward from the top wall and a third fastener connects the top wall flange to the sub-frame.

The sub-frame may be attached to a body structure of the vehicle by sub-frame attachment brackets and at least one fastener. The sub-frame is loaded through the tubular body during a collision that detaches the powertrain from the vehicle and that causes the powertrain to shift into engagement with the engagement end of the tubular body. The sub-frame may be detached from the body structure of the vehicle by fracturing the at least one fastener.

According to another aspect of this disclosure, a collision pulse reduction assembly is provided for a vehicle having a powertrain. The assembly includes a bumper beam and an energy absorbing crush element disposed between the bumper beam and the powertrain. A sub-frame disposed between the powertrain and a body structure of the vehicle is attached to the body structure by at least one fastener. A powertrain catcher bracket is disposed rearward of the powertrain and attached to the sub-frame. The assembly provides a load path for reducing a pulse of deceleration of the vehicle in a collision. The bumper beam receives an impact that is transferred in sequence to the crush element, then the powertrain, then the catcher bracket, then the sub-frame, and then the at least one fastener that causes the at least one fastener to fracture. The sub-frame is detached from the body structure when the fastener fractures.

According to other aspects of this disclosure regarding the collision pulse reduction assembly, the powertrain catcher bracket is spaced from the powertrain in an "as assembled" position and is engaged by the powertrain in a collision of sufficient severity to displace the powertrain from a powertrain mounting apparatus.

The catcher bracket may have a top wall, a right side wall and a left side wall that form a box-shaped enclosure extending between an engagement end and an attachment end and defining an open bottom. The collision pulse reduction assembly may further comprise a right side flange extending outwardly from the right side wall and a left side flange extending outwardly from the left side wall. An end wall may be provided at the engagement end that encloses the engagement end and provides a planar surface that is oriented to face a contact surface on the powertrain. The end wall is joined on a right edge to the right side wall and is joined on a left edge to the left side wall.

According to other aspects of this disclosure regarding the collision pulse reduction assembly, the sub-frame may be a clam shell structure including an upper panel and a lower panel and the powertrain catcher may include an upper flange that is attached to the upper panel and at least one lower flange that is attached to the lower panel. The at least one lower flange may further comprise a right flange and a left flange that are each connected to the lower panel. The powertrain catcher bracket may have a top wall, a right side wall and a left side wall that form a rectangular enclosure defining an open bottom. A right side flange may extend outwardly from the right side wall and a left side flange may extend outwardly from the left side wall. A first fastener may connect the right side flange to the sub-frame and a second fastener may connect the left side flange to the sub-frame. A top wall flange may extend rearward from the top wall and a third fastener may be used to connect the top wall flange to the sub-frame.

The sub-frame may be attached to a body structure of the vehicle by at least one sub-frame attachment bracket and at least one fastener. The powertrain may engage the powertrain catcher during a collision that detaches the powertrain from the vehicle. The powertrain catcher loads and detaches the sub-frame from the body structure of the vehicle by fracturing the at least one fastener.

The above aspects of this disclosure and other aspects will be described in greater detail below with reference to the attached drawings.

BRIEF DESCRIPTION OF THE DRAWINGS

FIG. 4 is a front/right perspective view of a powertrain catcher bracket.

FIG. 5 is a top plan view of the powertrain catcher bracket.

FIG. 6 is a diagrammatic side view of the front end of a vehicle prior to a collision in an "as assembled" condition.

FIG. 7 is a diagrammatic side view of the front end of a vehicle having a powertrain catcher bracket showing the powertrain engaging the powertrain catcher bracket as a result of the collision.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
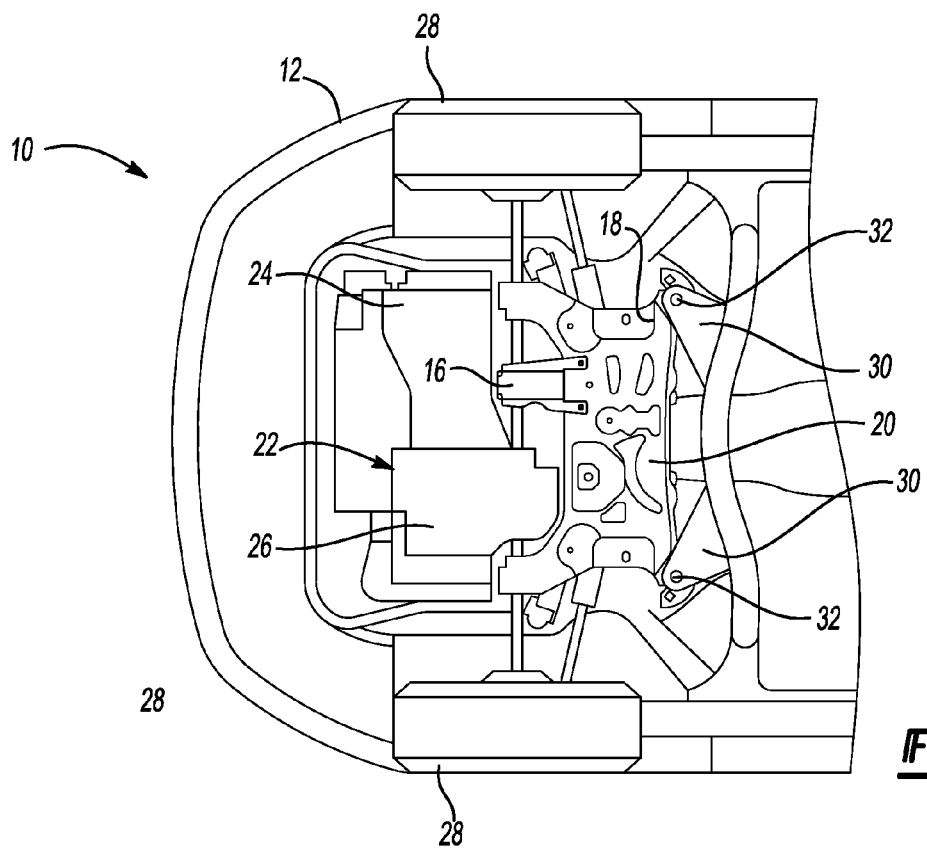
FIG. 1 is a fragmentary bottom plan view of a front end of a vehicle that is provided with a powertrain catcher bracket.

Referring to FIG. 1, a vehicle 10 is partially illustrated to show the front end 12 from below the vehicle. A catcher bracket 16, or tubular body, is attached to a sub-frame 18 of the vehicle. A lower panel 20 of the sub-frame 18 is visible in FIG. 1.

A powertrain is generally indicated by reference numeral 22. The powertrain 22 includes a combustion engine 24 and may also include an electric motor if the vehicle is a FHEV or a PHEV. The electric motor of the hybrid vehicle is not illustrated. The powertrain 22 also includes a transmission 26 that provides torque from the combustion engine 22, or electric motor (not shown), to the wheels 28 of the vehicle 10.

Sub-frame attachment brackets 30 connect the sub-frame 18 to the vehicle 10. Fasteners 32 are used to secure the sub-frame 18 to the vehicle 10.

Figure 2:
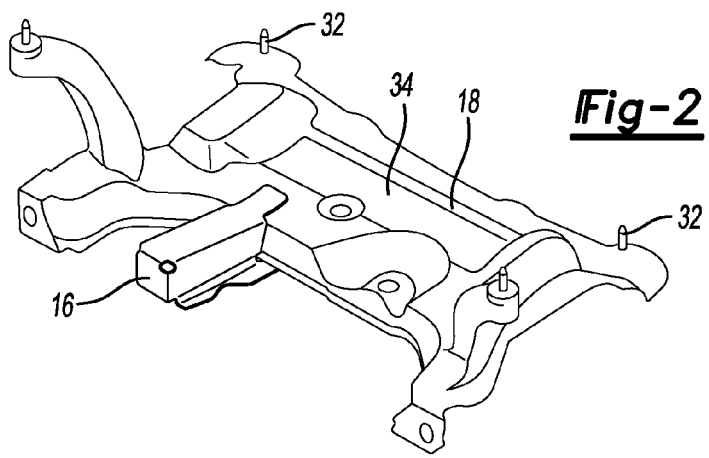
FIG. 2 is a perspective view of a powertrain catcher bracket attached to a sub-frame.
Figure 3:
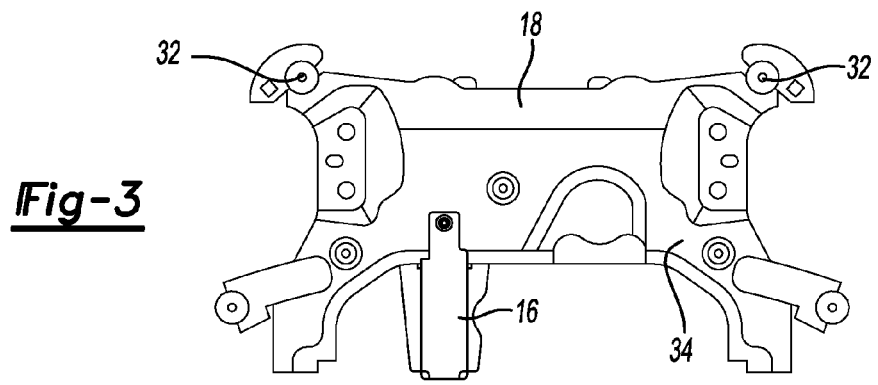
FIG. 3 is a top plan view of a powertrain catcher bracket attached to a sub-frame.

Referring to FIGS. 2 and 3, the catcher bracket 16 is shown attached to the sub-frame 18. An upper panel 34 of the sub-frame 18 is visible in FIGS. 2 and 3. The upper panel 34 and lower panel 20 of the sub-frame 18 are welded together in a clamshell manner to form the sub-frame 18. The fasteners 32 that are used to connect the sub-frame 18 to the vehicle 10 are shown installed on the sub-frame 18.

Referring to FIGS. 4 and 5, the structure of the catcher bracket 16 is shown in isolation. An engagement end wall 36 that is a planar surface is provided in a front portion 38 of the catcher bracket 16. The engagement end wall 36 provides an impact surface 40. The function of the impact surface 40 will be described with reference to FIG. 6 below. At the opposite end of the catcher bracket 16, an attachment end 42 is provided at a rear portion 44 of the catcher bracket 16.

The catcher bracket includes a top wall 48, a right sidewall 50 and a left sidewall 52. The catcher bracket 16 has an open bottom 54 that is defined by the right sidewall 50, left sidewall 52 and the engagement end wall 36. A right side flange 56 extends laterally outward from the right sidewall 50. A left side flange 58 extends laterally outward from the left sidewall 52. A right edge 62 of the engagement end wall 36 is welded to the right sidewall 50. A left edge 64 of the engagement end wall 36 is welded to the left sidewall 52.

An upper flange 66 extends in a rearward direction from the top wall 48. A lower flange 68 extends rearward from the right side flange 56 and the left side flange 58, respectively. An opening 70 is provided in the upper flange 66 and an opening 72 is provided in each of the lower flanges 68. A bolt 76 is inserted through the opening 70 in the upper flange 66 that connects the catcher bracket 16 to the sub-frame 18. A pair of bolts 78 are assembled into the opening 72 in the lower flanges 68.

Referring to FIGS. 6 and 7, a collision sequence is illustrated. Impact arrow A depicts the direction of the initial impact in a front end collision. In a front end collision, a bumper beam 80 is initially contacted and driven in a rearward direction against crush elements 82, or crush cans, that absorb some of the energy of the impact. In a collision that is of sufficient severity to fully compress the bumper 80 and crush cans 82, the impact continues to displace the powertrain 22 from its "as assembled" position shown in FIG. 6 and into engagement with the catcher bracket 16, as shown in FIG. 7. The arrow L in FIG. 7 illustrates the direction of displacement of the powertrain 22 as it is driven into engagement with the catcher bracket 16. The location of the impact is illustrated by the impact star I in FIG. 7. The force of the impact is transferred from the powertrain 22 to the catcher bracket 16.

The powertrain 22, as shown in FIG. 6, is spaced from the catcher bracket 16. An engagement surface 84 on the powertrain 22 is arranged in a generally parallel and spaced relationship relative to the impact surface 40 of the catcher bracket 16. The force of the impact is transferred from the catcher bracket 16 to the sub-frame 18. Forces applied to the sub-frame 18 cause the fasteners 32 connecting the sub-frame 18 to a body structure 86, or body-in-white. The force applied to the sub-frame 18 fractures the fasteners 32 allowing the powertrain 22 and sub-frame 18 to be decoupled from the body-in-white 86.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A catcher bracket disposed between a powertrain and a sub-frame of a vehicle comprising:
   a tubular body having:
      an engagement end on a front portion that, as assembled, has an impact surface that is spaced from and faces the powertrain;
      an attachment end opposite the engagement end on a rear portion, wherein the sub-frame is a clam shell structure including an upper panel and a lower panel, and wherein the attachment end includes an upper flange that is attached to the upper panel and at least one lower flange that is attached to the lower panel; and
   at least one fastener that secures the attachment end of the tubular body to the sub-frame.

2. The catcher bracket of claim 1 wherein the tubular body has a top wall, a right side wall, and a left side wall that form a box-shaped enclosure extending between the engagement end and the attachment end and defining an open bottom.

3. The catcher bracket of claim 2 further comprising a right side flange extending outwardly from the right side wall and a left side flange extending outwardly from the left side wall.

4. The catcher bracket of claim 3 wherein the impact surface further comprises an end wall is provided at the engagement end that encloses the engagement end and includes the impact surface that is oriented to face a contact surface on the powertrain.

5. The catcher bracket of claim 4 wherein the end wall is joined on a right edge to the right side wall and is joined on a left edge with the left side wall.

6. The catcher bracket of claim 1 wherein the at least one lower flange further comprises a right flange and a left flange that are each connected to the lower panel.

7. The catcher bracket of claim 6 wherein the tubular body has a top wall, a right side wall and a left side wall that form a rectangular enclosure extending between the engagement end and the attachment end and defining an open bottom, wherein a right side flange extends outwardly from the right side wall and a left side flange extends outwardly from the left side wall, wherein a first fastener connects the right side flange to the sub-frame and a second fastener connects the left side flange to the sub-frame, and wherein a top wall flange extends rearward from the top wall and a third fastener connects the top wall flange to the sub-frame.

8. The catcher bracket of claim 1 wherein the sub-frame is attached to a body structure of the vehicle by sub-frame attachment brackets and at least one fastener, wherein in a collision that detaches the powertrain from the vehicle causing the powertrain to shift into engagement with the engagement end of the tubular body that loads the sub-frame through the tubular body, and wherein the sub-frame is detached from the body structure of the vehicle by fracturing the at least one fastener.

9. A collision pulse reduction assembly for a vehicle having a powertrain comprising:
   a bumper beam;
   an energy absorbing crush element disposed between the bumper beam and the powertrain;
   a sub-frame disposed between the powertrain and a body structure of the vehicle and that is attached to the body structure by at least one fastener, wherein the sub-frame is a clam shell structure including an upper end panel and a lower panel; and
   a powertrain catcher bracket disposed rearward of the powertrain and attached to the sub-frame, wherein the powertrain catcher includes an upper flange that is attached to the upper panel and at least one lower flange that is attached to the lower panel, wherein a load path is provided for reducing a pulse of deceleration of the vehicle in a collision with the bumper beam receiving an impact that is transferred in sequence to the crush element, then the powertrain, then the catcher bracket, then the sub-frame, and then the at least one fastener that causes the at least one fastener to fracture and thereby detach the sub-frame from the body structure.

10. The collision pulse reduction assembly of claim 9 wherein the powertrain catcher bracket is spaced from the powertrain in an as assembled position and is engaged by the powertrain in a collision of sufficient severity to displace the powertrain from a powertrain mounting apparatus.

11. The collision pulse reduction assembly of claim 9 wherein the catcher bracket has a top wall, a right side wall and a left side wall that form a box-shaped enclosure extending between an engagement end and an attachment end and defining an open bottom.

12. The collision pulse reduction assembly of claim 11 further comprising a right side flange extending outwardly from the right side wall and a left side flange extending outwardly from the left side wall.

13. The collision pulse reduction assembly of claim 12 further comprising an end wall provided at the engagement end that encloses the engagement end and provides a planar surface that is oriented to face a contact surface on the powertrain.

14. The collision pulse reduction assembly of claim 13 wherein the end wall is joined on a right edge to the right side wall and is joined on a left edge to the left side wall.

15. The collision pulse reduction assembly of claim 9 wherein the at least one lower flange further comprises a right flange and a left flange that are each connected to the lower panel.

16. The collision pulse reduction assembly of claim 15 wherein the powertrain catcher bracket has a top wall, a right side wall and a left side wall that form a rectangular enclosure defining an open bottom, wherein a right side flange extends outwardly from the right side wall and a left side flange extends outwardly from the left side wall, wherein a first fastener connects the right side flange to the sub-frame and a second fastener connects the left side flange to the sub-frame, and wherein a top wall flange extends rearward from the top wall and a third fastener connects the top wall flange to the sub-frame.

17. The collision pulse reduction assembly of claim 9 wherein the sub-frame is attached to a body structure of the vehicle by sub-frame attachment brackets and at least one fastener, wherein during a collision that detaches the powertrain from the vehicle, the powertrain engages the powertrain catcher that loads the sub-frame, and wherein the sub-frame is detached from the body structure of the vehicle by fracturing the at least one fastener.

* * * * *